Figure 1:
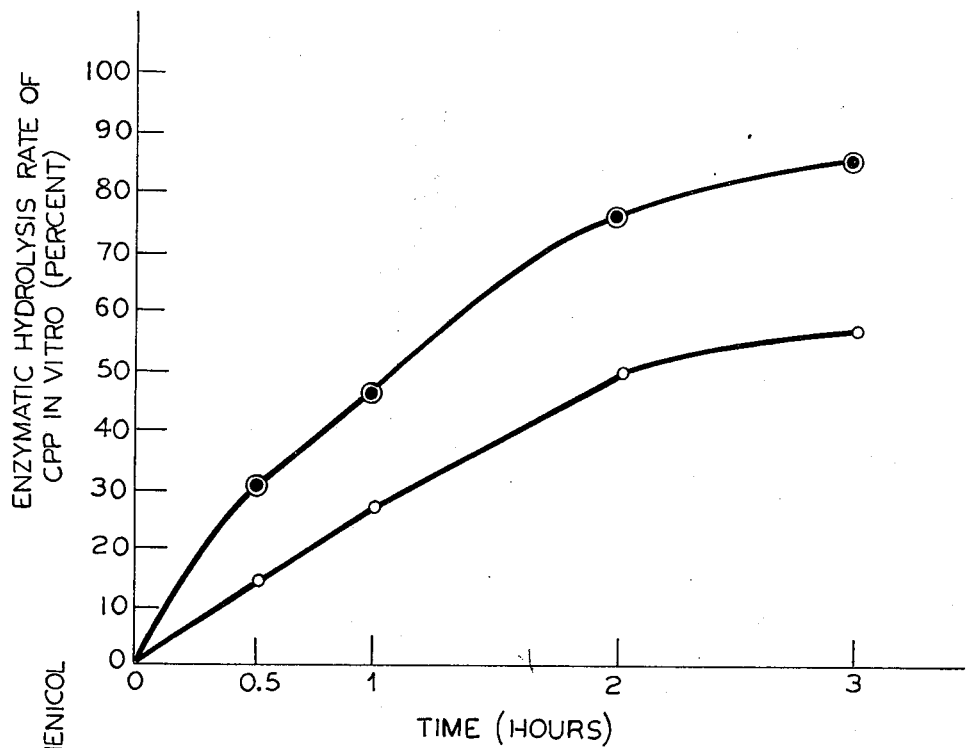

United States Patent [19]
Nakamura et al.

[11] 3,881,020
[45] Apr. 29, 1975

[54] PROCESS OF PREPARING AQUEOUS SUSPENSION OF CHLORAMPHENICOL PALMITATE

[75] Inventors: Toshio Nakamura, Ibaraki; Tadao Maeda, Minoo; Tomoaki Kiyotaki, Ibaraki; Yasuo Katsuhara, Kobe; Yoshio Sakamoto, Honmachi; Mitsuo Iwade, Senrioka Higashi, all of Japan

[73] Assignee: Sumitomo Chemical Company, Limited, Osaka, Japan

[22] Filed: Dec. 17, 1971

[21] Appl. No.: 209,150

[30] Foreign Application Priority Data
Dec. 22, 1970 Japan.............................. 45-117195

[52] U.S. Cl.................................. 424/324; 424/80
[51] Int. Cl............................................ A61k 27/00
[58] Field of Search............................ 424/324, 80

[56] References Cited
FOREIGN PATENTS OR APPLICATIONS
671,023 10/1950 United Kingdom................. 424/324
866,787 8/1956 United Kingdom................. 424/324

*Primary Examiner*—Albert T. Meyers
*Assistant Examiner*—Daren M. Stephens
*Attorney, Agent, or Firm*—Wenderoth, Lind & Ponack

[57] ABSTRACT

An aqueous suspension of chloramphenicol palmitate is prepared by melting chloramphenicol palmitate previously alone, mixing the melt with a hot aqueous solution containing one or more dispersing agents, cooling the dispersion, and then warming the same to prepare a bitterless aqueous suspension containing extremely fine and uniform alpha-type crystals of chloramphenicol palmitate having a high bioactivity.

3 Claims, 2 Drawing Figures

INVENTORS
TOSHIO NAKAMURA
TADAO MAEDA
TOMOAKI KIYOTAKI
YASUO KATSUHARA
YOSHIO SAKAMOTO
MITSUO IWADE

BY *Wenderoth, Lind & Ponack*
ATTORNEYS

PROCESS OF PREPARING AQUEOUS SUSPENSION OF CHLORAMPHENICOL PALMITATE

This invention relates to a process for preparing a bitterless aqueous suspension containing extremely fine and uniform alpha-type crystals of Chloramphenicol palmitate having a high bioactivity.

More particularly the present invention is a process for preparing a bitterless aqueous suspension containing extremely fine and uniform alpha-type crystals of chloramphenicol palmitate characterized by heating chloramphenicol palmitate alone previously to melt, mixing the melt with a hot aqueous solution containing one or more dispersing agents, cooling the dispersion and then warming the dispersion with or without the further addition of an aqueous solution containing one or more surface active agents.

The dispersing agents to be used in this invention may be any of those for pharmaceutical uses such as, polyvinyl alcohol, polyvinylpyrrolidone, hydroxypropylcellulose, sodium carboxymethylcellulose, hydroxypropyl methylcellulose, gum arabic, carboxyvinyl polymer, polyethylene glycols, propylene glycol, sorbitan fatty acid esters, polyoxyethylene sorbitan fatty acid esters, polyoxyethylene fatty acid esters, polyoxyethylene castor oil derivatives, glyceryl fatty acid esters, sucrose fatty acid esters, alkyl sulfates, dialkylsulfosuccinates and fatty acid sarcosinates, etc.

The surface active agents to be used here may be any of those for pharmaceutical uses such as, sorbitan fatty acid esters, polyoxyethylene sorbitan fatty acid esters, polyoxyethylene fatty acid esters, polyoxyethylene castor oil derivatives, glyceryl fatty acid esters, sucrose fatty acid esters, alkyl sulfates, dialkylsulfosuccinates and fatty acid sarcosinates.

The dosage form of an antibiotic product for oral administration is desired to be such a preparation as is favorable in the absorpton in gastro-intestinal tract and rapidly reaches to an expected serum concentration. In the case of obtaining chloramphenicol palmitate preparation fitted to that object, it is very important to get a preparation wherein the palmitate is contained in the form of extremely fine and uniform alpha-type crystals having a high bioactivity.

In the suspension containing chloramphenicol palmitate in the form of fine and uniform alpha-type crystals, all the crystals are so fine that the amount of an additive required to disperse the suspending particles for a long time may be quite small. In consequence, non-viscous suspension can be prepared, which is very convenient to use.

It is known that chloramphenicol palmitate is substantially insoluble and has no bitter taste. However, in getting an aqueous preparation thereof, there is caused bitterness due to surface active agents which will partly solubilize the palmitate. Therefore, it is desirable to prepare a suspension having no bitter taste without causing any solubilization of chloramphenicol palmitate by surface active agents.

Further, in order to produce an aqueous preparation of chloramphenicol palmitate is an industrial scale, it is necessary not only to take the above points into consideration but also to develop a method which does not require any complicated operations.

For the process for preparing an aqueous suspension of chloramphenicol palmitate, there have been proposed several methods disclosed in (1) Japanese Patent Publication No. 5798/1960, (2) Japanese Patent Publication No. 33676/1970, (3) East German Patent No. 54685 (1966) and (4) West German Patent No. 1936176 (1970).

Japanese Patent Publication No. 5798/1960 discloses a process for obtaining amorphous crystals of chloramphenicol palmitate by dissolving the same under heating in a hydrophilic solvent and quenching the solution. However, this method requires complicated operations of isolating the crystals of chloramphenicol palmitate and then resuspending them in water. Further, the crystals are not so fine that a large amount of the additive is necessary in order to disperse the suspending particles for a long time. However, the use of such a large amount of the additive would cause high viscosity of the suspension, which is inconvenient to use.

According to the method disclosed in Japanese Patent Publication No. 33676/1970, chloramphenicol palmitate is mixed and melted together with a surface active agent and is then dispersed in water to obtain fine crystals. However, chloramphenicol palmitate, when it is mixed and melted with a surface active agent, will be partly solubilized and as a result the suspension sometimes becomes bitter.

East German Patent No. 54685 (1966) is directed to a process wherein chloramphenicol palmitate is dissolved in a hydrophilic solvent and is then poured into water. In this case, too, the operation is complicated in respect that crystals of chloramphenicol palmitate must be isolated and then resuspended in water.

In West German Patent No. 1936176 (1970) there is described a process wherein chloramphenicol palmitate crystals, an ionic surface active agent and water are heated to be emulsified and then an inorganic salt is added to obtain fine crystals of the palmitate. However, in this process, a large amount of the ionic surface active agent which is problematical in respect of toxicity must be used. Further, as the anionic active agent loses the surface activity due to the gastric acid after the oral administration, the dispersed particles of the chloramphenicol palmitate will be likely to cohere to reduce the bioactivity. And moreover in this case, too, the prepared suspension may become bitter.

We have now found a process for preparing a bitterless aqueous suspension containing extremely fine and uniform alpha-type crystals of chloramphenicol palmitate having a high bioactivity.

Thus this invention provides a process for the preparation of a bitterless aqueous suspension containing extremely fine and uniform alpha-type crystals of chloramphenicol palmitate which could not have been obtained by any conventional process, and is characterized by melting chloramphenicol palmitate previously alone, mixing the melt with a hot aqueous solution containing one or more dispersing agents so as to prepare a dispersion in which fine oily particles of chloramphenicol palmitate are dispersed cooling the dispersion and warming the same without or with the addition of an aqueous solution containing one or more surface active agents so as to change the dispersed chloramphenicol palmitate particles to alpha-type crystals.

According to the present invention, extremely fine and uniform alpha-type crystals which could never be obtained by any ordinary mechanical milling or conventional process are obtained and as a result not only the bioactivity of the alpha-type crystals of the palmitate becomes much higher but also a dispersion having a high stability can be obtained. Further, as compared with the known process for preparing an aqueous suspension, after having obtained an emulsion of chloramphenicol palmitate melted together with a surface active agent in hot water, there can be prepared by the present invention an aqueous suspension having no bitter taste and which is very favorable for oral administration.

As a result of concentrating our investigation to find the conditions for preparing a suspension containing very fine and uniformly sized alpha-type crystals, we have discovered that, in case previously alone melted chloramphenicol palmitate is mixed with a hot aqueous solution containing one or more dispersing agents and cooled immediately, the dispersed particles of the palmitate will become fine amorphous type but, when the dispersion is warmed, the particles will be changed to alpha-type crystals and that the size of the alpha-type crystals can be easily adjusted to any size according to the controlled warming conditions. That is to say, it has been found that, in order to obtain extremely fine and uniform alpha-type crystals, it is very important to warm the immediately cooled dispersion under controlled warming conditions. It has been further found that, in some cases, it is more preferable to conduct the warming after adding surface active agents in order to accelerate the change of chloramphenicol palmitate particles to extremely fine and uniform alpha-type crystals more efficiently.

The transition temperature to alpha-type crystals in the present invention is preferable to be 30° to 60°C. in view of the operation and the uniformity and size of the alpha-type crystals. Further, in order to obtain extremely fine and uniform alpha-type crystals, it is very preferable to keep the temperature of the dispersion at 40° to 50°C.

According to the present invention, alpha-type crystals are extremely fine and uniform, and the particle diameter may be varied according to the warming conditions in the process of the change of chloramphenicol palmitate particles to alpha-type crystals. Thus, it is possible to obtain very fine crystals of an average particle diameter, for example, of less than 0.1 micron.

In carrying out the process of the present invention, chloramphenicol palmitate alone is first heated to melt and then the melt is mixed with a hot aqueous solution containing dispersing agents heated at a temperature above 60°C., preferably near the melting point of the palmitate. In this process, the oil phase which is the melt of chloramphenicol palmitate may be added either into the aqueous phase which is an aqueous solution containing the dispersing agents or reversely the aqueous phase containing the dispersing agents may be added into the oil phase.

In this case Gaulin (Trade Mark) homogenizer or ultrasonic homogenizer may be effectively used to make the dispersed oily particles finer and more uniform.

Further, it is possible and preferable to add suspending agents, antiseptics, sweetening agents or perfumes to an aqueous suspension containing very fine and uniform alpha-type crystals obtained by the process of the present invention, to prepare a syrup which has no bitter taste and is preferable for oral administration.

As an example of the process of the present invention, 1 to 20 parts of chloramphenicol palmitate alone are first melted at 90° to 95°C. and added into a solution prepared by dissolving 0.05 to 10 parts of one or more dispersing agents in 70 to 99 parts of water heated at 90° to 95°C. and mixed by a suitable agitator. The resulted mixture is further dispersed by treating with a high-efficient homogenizing machine such as Gaulin homogenizer. Then the dispersion is immediately cooled to the normal or room temperature. Thereafter the dispersion is warmed with or without the addition of 0.05 to 10 parts of one or more surface active agents which may be dissolved in water so as to be 1 to 10 parts in total, under agitation for 1 to 3 hours at 40° to 50°C. The resulting warm dispersion is cooled to the normal temperature to prepare a bitterless aqueous suspension containing very fine and uniform alpha-type crystals of chloramphenicol palmitate.

According to the desired concentration of the palmitate in the final aqueous suspension, the proportions of the chloramphenicol palmitate, additives and water can be varied within the above mentioned ranges.

The above mentioned dispersing agent may be any of those for pharmaceutical uses but is preferable to be polyvinyl alcohol, polyvinylpyrrolidone, hydroxypropylcellulose, sodium carboxymethylcellulose, hydroxypropyl methylcellulose, gum arabic or carboxyvinyl polymer for preparing the good suspension with no bitter taste.

Figure 2:
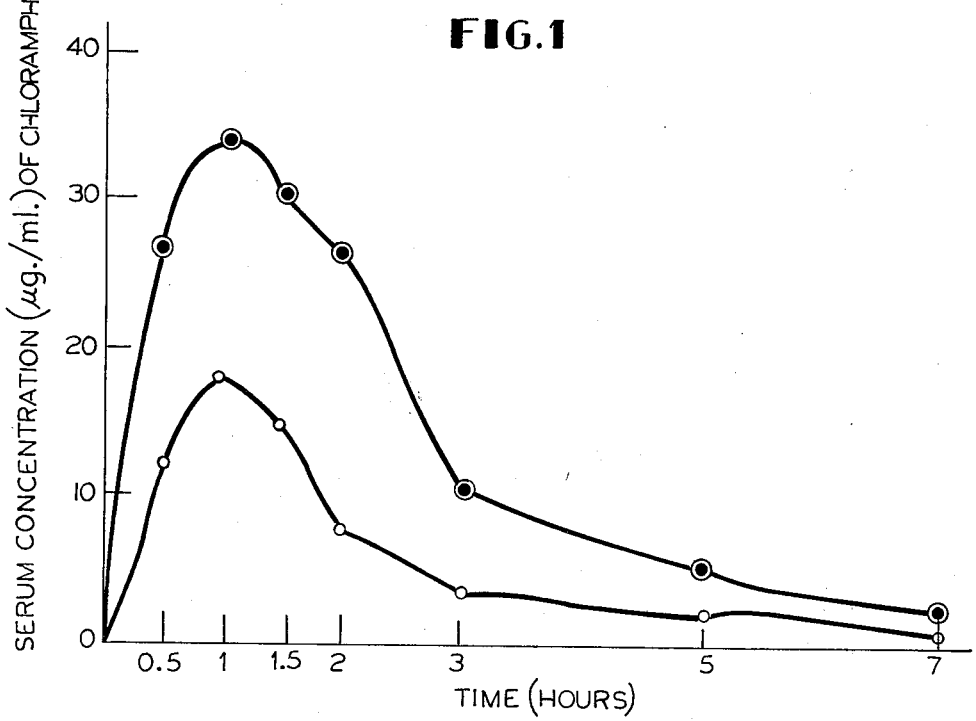

The results of determining the enzymatic hydrolysis rates in vitro and the serum concentrations of chloramphenicol after administering the aqueous suspension (Example 1) containing fine alpha-type crystals of chloramphenicol palmitate obtained by the present invention to rats are shown in FIG. 1 and FIG. 2. The drawings also show data obtained for comparison by using a suspension of the same formula except that rather large alpha-type crystals of the palmitate are suspended. In FIGS. 1 and 2, ⊙ represents the result of the fine crystals obtained by this invention while ○ represents that of rather large crystals obtained by the known method. It will be understood therefrom that, in the enzymatic hydrolysis rate in vitro, the fine alpha-type crystals by the present invention are 1.5 to 2 times as high as the rather large alpha-type crystals obtained by the known method. Further, in the maximum serum concentration of rats, the fine alpha-type crystals are 2 to 3 times as high as the rather large alpha-type crystals and are evidently higher also in the total amount absorbed in gastro-intestinal tract. These facts mean the higher antibiotic activity of the fine alpha-type crystals in human body.

1. Samples
   1. Suspension containing alpha-type crystals (less than 0.1 micron) of chloramphenicol palmitate obtained by Example 1.
   2. Suspension containing alpha-type crystals (larger than 1 micron) of chloramphenicol palmitate obtained by dissolving chloramphenicol palmitate in alcohol, pouring the solution into water, isolating the crystals and resuspending them in a vehicle of the same formula as in Example 1.
2. Experimental methods
   1. Determination of the enzymatic hydrolysis rate in vitro.

An aqueous suspension containing chloramphenicol palmitate (equivalent to about 30 mg. of chloramphenicol) is added to 150 ml. of simulated intestinal fluid of Japan Pharmacopoeia VII (with the addition of 0.5 percent of a ox bile dried extract), the mixture is shaken constantly in a thermostatic tank at 37°C. then free chloramphenicol in the fluid at various times after shaking is quantitatively determined by the UV absorbing method and the rate of hydrolysis is calculated.

2. Assay of the serum concentration of rats.

An aqueous suspension of chloramphenicol palmitate (equivalent to 300 mg. of chloramphenicol/kg. of the rat body weight) is orally administered to Wister series male rats (3 rats in one group) of a body weight of about 200 g. and free chloramphenicol in the blood at various times after drug administration is quantitatively determined by the microbioassay.

The invention will be further explained by means of the following Examples, which are given for the illustration purpose only and not for limiting the present invention in any way. In these Examples, all parts are by weight.

EXAMPLE 1

11 parts of chloramphenicol palmitate alone are previously melted at 90° to 95°C., the melt is added to a solution prepared by dissolving 4 parts of polyvinyl alcohol in 75 parts of water at the same temperature as above. The mixture is roughly mixed by a TK homomixer (manufactured by Tokushu Kika Kogyo K.K.) and the resulting dispersion is further treated under a pressure of 3000 to 3500 lbs./in.$^2$ by using a Gaulin homogenizer to prepare a dispersion containing very fine and uniform particles of chloramphenicol palmitate. This dispersion is immediately cooled to the normal temperature with cold water. Then a solution prepared by dissolving 1 part of polyoxyethylene sorbitan monooleate in 9 parts of water is added to the dispersion and the mixture is agitated for 2 hours at 40° to 45°C. and is cooled to the normal temperature to prepare a bitterless aqueous suspension of alpha-type crystals (less than 0.1 micron) of chloramphenicol palmitate. On the other hand, a solution is prepared by dissolving 60 parts of sucrose, 50 parts of a D-sorbit solution, 0.5 part of sodium carboxymethylcellulose and a proper amount of each of an antiseptic, defoaming agent and perfume in 20 parts of water and then is uniformly mixed with the above aqueous suspension of the palmitate to prepare a syrup having no bitter taste.

EXAMPLE 2

11 parts of chloramphenicol palmitate alone are previously melted at 90° to 95°C., and the melt is added to a solution prepared by dissolving 5 parts of polyoxyethylenesorbitan monooleate in 74 parts of water at the same temperature. The mixture is treated to a dispersion in the same manner as in Example 1 and the resulting dispersion is quenched to 10°C. This dispersion is warmed to 45° to 50°C., and agitated for 1 hour and then cooled to the normal temperature to prepare a bitterless aqueous suspension of alpha-type crystals (less than 0.1 micron) of chloramphenicol palmitate.

EXAMPLE 3

11 parts of chloramphenicol palmitate alone are previously melted at 90° to 95°C., and the melt is added to a solution prepared by dissolving 1 part of polyoxyethylene sorbitan monooleate and 0.5 part of sucrose fatty acid ester (HLB 15.0) in 77.5 parts of water at the same temperature. The mixture is rendered to a uniform dispersion by using a ultrasonic homogenizer (manufactured by Choompa Kogyo K.K.) and the resulted dispersion is quenched to the normal temperature. The cooled dispersion is then warmed to 40° to 45°C., and agitated for 2 hours and is then cooled to the normal temperature to prepare an aqueous suspension of alpha-type crystals (less than 0.1 micron) of chloramphenicol palmitate with no bitter taste.

EXAMPLE 4

11 parts of chloramphenicol palmitate alone are previously melted at 90° to 95°C., and the melt is added to a solution prepared by dissolving 2 parts of polyvinyl alcohol and 2 parts of polyvinylpyrrolidone in 75 parts of water at the same temperature. The mixture is rendered to a dispersion in the same manner as in Example 1 and the resulting dispersion is immediately cooled to room temperature. This dispersion is warmed at 40° to 45°C. for 2 hours under agitation to prepare a bitterless aqueous suspension of alpha-type crystals (less than 0.1 micron) of chloroamphenicol palmitate.

EXAMPLE 5

5.5 parts of chloramphenicol palmitate alone are previously melted at 90° to 95°C., and a solution prepared by dissolving 2 parts of polyoxyethylene monostearate and 5 parts of polyethylene glycol 400 in 87.5 parts of water at the same temperature is added to the melt. The mixture is treated to a dispersion in the same manner as in Example 1 and the resulting dispersion is quenched to the normal temperature. This dispersion is warmed and is agitated for 2 hours at 40° to 45°C. to prepare a bitterless aqueous suspension of alpha-type crystals (less than 0.1 micron) of chloramphenicol palmitate.

EXAMPLE 6

11 parts of chloramphenicol palmitate alone are previously melted at 90 to 95°C., and the melt is added to a solution prepared by dissolving 2 parts of polyvinyl alcohol in 75 parts of water at the same temperature. The mixture is rendered to a dispersion in the same manner as in Example 1 and the resulting dispersion is immediately cooled to the normal temperature. A solution prepared by dissolving 1 part of polyoxyethylene sorbitan monooleate in 9 parts of water is added to the dispersion and the mixture is warmed under agitation to prepare a bitterless aqueous suspension of alpha-type crystals of chloramphenicol palmitate of such various sizes as in the following according to the warming temperature and time:

| Temperature (°C.) | Time (hours) | Average particle diameter (micron) |
| --- | --- | --- |
| 40 – 45 | 1 | 0.06 |
|  | 2 | 0.07 |
|  | 3 | 0.08 |
| 45 – 50 | 1 | 0.07 |
|  | 2 | 0.08 |
|  | 3 | 0.09 |
| 50 – 55 | 1 | 0.11 |
|  | 2 | 0.12 |
|  | 3 | 0.13 |
| 55 – 60 | 1 | 0.16 |
|  | 2 | 0.18 |
|  | 3 | 0.19 |

EXAMPLE 7

11 parts of chloramphenicol palmitate alone are previously melted at 90° to 95°C., and the melt is added to a solution prepared by dissolving 4 parts of hydroxypropylcellulose in 75 parts of water at the same temperature. The mixture is rendered to a dispersion in the same manner as in Example 1 and the resulting dispersion is immediately cooled to the normal temperature. A solution prepared by dissolving 1 part of polyoxyethylene sorbitan monooleate and 0.5 part of sucrose fatty acid ester (HLS 15.0) in 8.5 parts of water at the same temperature is added to the dispersion and the mixture is agitated for 2 hours at 40° to 45°C. and is then cooled to the normal temperature to prepare a bitterless aqueous suspension of alpha-type crystals (less than 0.1 micron) of chloramphenicol palmitate.

What we claim is:

1. A process for the preparation of a bitterless aqueous suspension containing uniform alpha-type crystals of chloramphenicol palmitate which comprises melting from 1 to 20 parts chloramphenicol palmitate alone at a temperature of from 90°–95°C, mixing the melt with an aqueous solution containing from 0.05 to 10 parts of one or more pharmaceutically acceptable dispersing agents selected from the group consisting of polyvinyl alcohol, polyvinylpyrrolidone, hydroxypropylcellulose, sodium carboxymethylcellulose, hydroxypropyl methylcellulose, gum arabic, carboxyvinyl polymer, polyethylene glycols, propylene glycol, sorbitan fatty acid esters, polyoxyethylene sorbitan fatty acid esters, polyoxyethylene fatty acid esters, polyoxyethylene castor oil derivatives, glyceryl fatty acid esters, sucrose fatty acid esters, alkyl sulfates, dialkylsulfosuccinates and fatty acid sarcosinates and 70 to 99 parts water at a temperature of from 60°C to the melting point of the chloramphenicol palmitate, cooling the resulting dispersion to room temperature and thereafter reheating the thus cooled dispersion to a temperature of from 40° to 60°C to obtain alpha-type crystals of chloramphenicol palmitate having an average particle diameter of from 0.06 to 0.19 microns.

2. A process for the preparation of a bitterless aqueous suspension containing uniform alpha-type crystals of chloramphenicol palmitate which comprises melting from 1 to 20 parts chloramphenicol palmitate at a temperature of 90° to 95°C, mixing the melt with an aqueous solution containing from 0.05 to 10 parts of one or more pharmaceutically acceptable dispersing agents selected from the group consisting of polyvinyl alcohol, polyvinylpyrrolidone, hydroxypropylcellulose, sodium carboxymethylcellulose, hydroxypropyl methylcellulose, gum arabic, carboxyvinyl polymer, polyethylene glycols, propylene glycol, sorbitan fatty acid esters, polyoxyethylene sorbitan fatty acid esters, polyoxyethylene fatty acid esters, polyoxyethylene castor oil derivatives, glyceryl fatty acid esters, sucrose fatty acid esters, alkyl sulfates, dialkylsulfosuccinates and fatty acid sarcosinates and 70 to 99 parts water at a temperature of from 60°C to the melting point of the chloramphenicol, cooling the resulting dispersion to room temperature, adding to the dispersion an aqueous solution containing 1 to 10 parts based on the total parts of the aqueous solution of one or more pharmaceutically acceptable surface active agents selected from the group consisting of sorbitan fatty acid esters, polyoxyethylene sorbitan fatty acid esters, polyoxyethylene fatty acid esters, polyoxyethylene castor oil derivatives, glyceryl fatty acid esters, sucrose fatty acid esters, alkly sulfates, dialkylsulfosuccinates and fatty acid sarcosinates and reheating the resulting dispersion to a temperature of from 40° to 60°C to obtain alpha-type crystals of chloramphenicol palmitate having an average particle diameter of from 0.06 to 0.19 microns.

3. A pharmaceutical preparation in the form of an aqueous suspension prepared by the process which comprises melting 1 to 20 parts chloramphenicol palmitate alone at a temperature of from 90° to 95°C, mixing the melt with an aqueous solution containing from 0.05 to 10 parts of one or more pharmaceutically acceptable dispersing agents selected from the group consisting of polyvinyl alcohol, polyvinylpyrrolidone, hydroxypropylcellulose, sodium carboxymethylcellulose, hydroxypropyl methylcellulose, gum arabic, carboxyvinyl polymer, polyethylene glycols, propylene glycol, sorbitan fatty acid esters, polyoxyethylene sorbitan fatty acid esters, polyoxyethylene fatty acid esters, polyoxyethylene castor oil derivatives, glyceryl fatty acid esters, sucrose fatty acid esters, alkyl sulfates, dialkylsulfosuccinates and fatty acid sarcosinates and 70 to 99 parts water at a temperature of from 60°C to the melting point of the chloramphenicol palmitate, cooling the resulting dispersion to room temperature, and subjecting the resulting cooled dispersion to A. reheating to a temperature of from 40° to 60°C, or B. addition of an aqueous solution containing from 1 to 10 parts based on the total parts of aqueous solution of 1 or more pharmaceutically acceptable surface active agents selected from the group consisting of sorbitan fatty acid esters, polyoxyethylene fatty acid esters, polyoxyethylene castor oil derivatives, glyceryl fatty acid esters, sucrose fatty acid esters, alkyl sulfates, dialkylsulfosuccinates and fatty acid sarcosinates and reheating the resulting solution to a temperature of from 40° to 60°C to obtain alpha-type crystals of chloramphenicol palmitate having an average particle diameter of from 0.06 to 0.19 microns.

* * * * *